No. 732,706. PATENTED JULY 7, 1903.
C. BURWELL.
COAL BOX.
APPLICATION FILED JAN. 7, 1903.
NO MODEL. 2 SHEETS—SHEET 1.
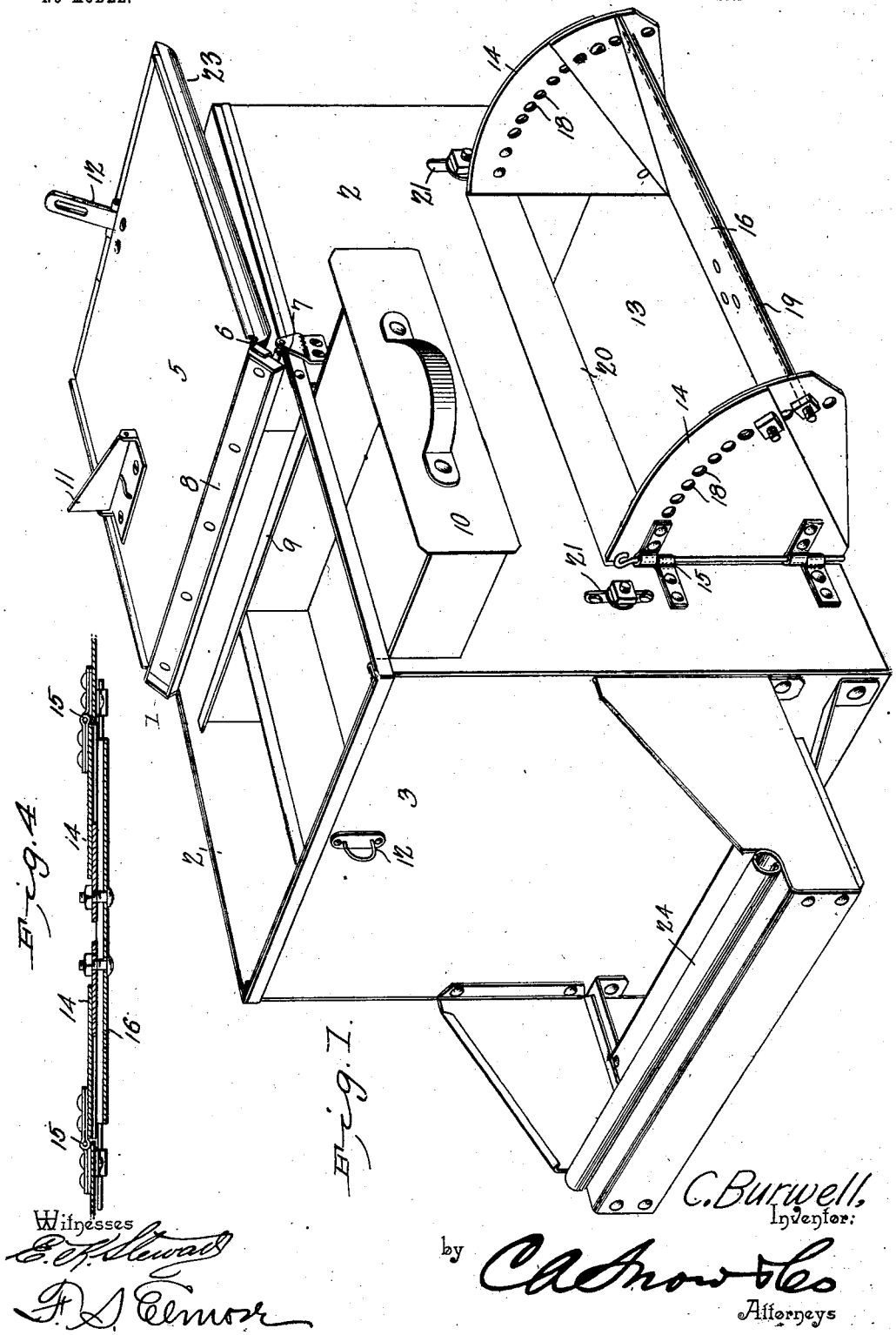

No. 732,706. PATENTED JULY 7, 1903.
C. BURWELL.
COAL BOX.
APPLICATION FILED JAN. 7, 1903.
NO MODEL. 2 SHEETS—SHEET 2.
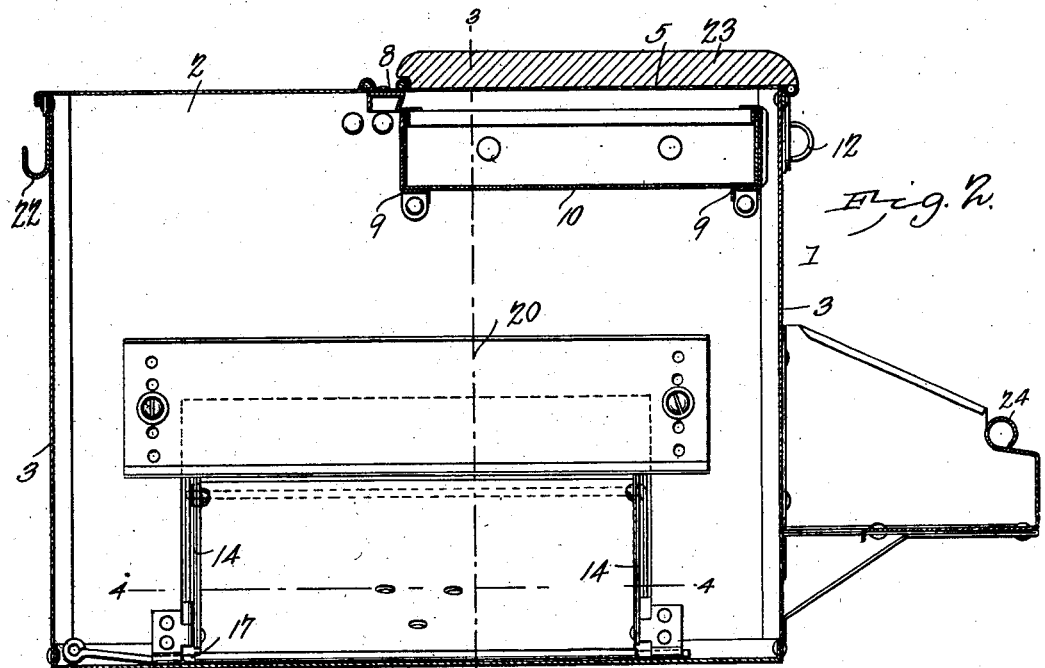
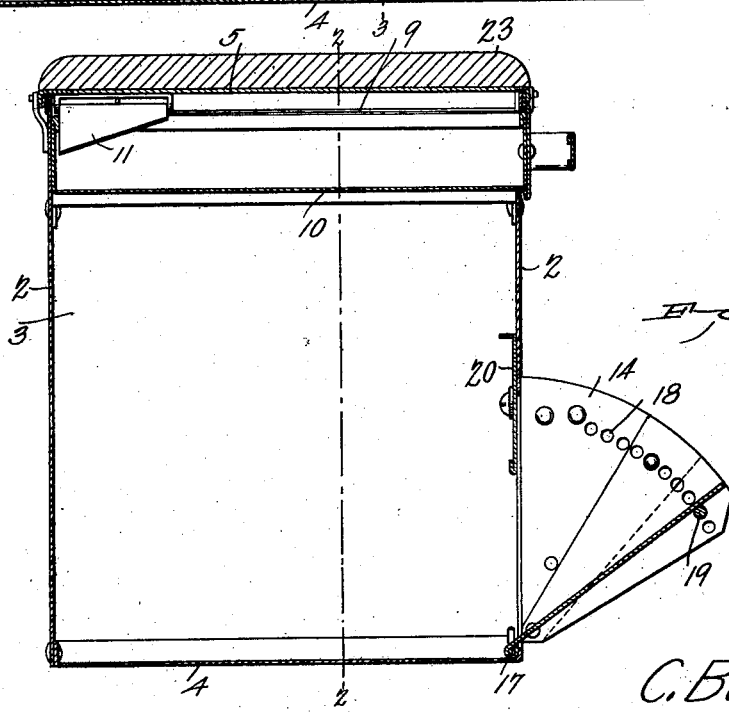
Witnesses
C. Burwell,
Inventor:
by C. A. Snow & Co.
Attorneys No. 732,706.

Patented July 7, 1903.

UNITED STATES PATENT OFFICE.

CYRUS BURWELL, OF MADISON COUNTY, ILLINOIS.

COAL-BOX.

SPECIFICATION forming part of Letters Patent No. 732,706, dated July 7, 1903.

Application filed January 7, 1903. Serial No. 138,164. (No model.)

*To all whom it may concern:*

Be it known that I, CYRUS BURWELL, a citizen of the United States, residing in the county of Madison and State of Illinois, have invented a new and useful Coal-Box, of which the following is a specification.

My invention relates to coal-boxes, and has for its objects to produce a device of this character which will be simple of construction, efficient in operation, one from which the coal may be readily removed from time to time as circumstances require, and a device which as a whole will be admirably adapted for use upon traction-engines or the like.

To these ends the invention comprises the combination, with a coal-box, of a discharge-spout therefor, said spout comprising end members projecting from the box and a side member pivoted at one edge and adapted to swing on its pivot toward and from the box and means for securing the side member with relation to the end members in any desired adjusted position.

The invention further comprises the details of construction and combination of parts more fully hereinafter described.

In the accompanying drawings, Figure 1 is a perspective view of the device. Fig. 2 is a longitudinal section through the same. Fig. 3 is a transverse section on the line 3 3 of Fig. 2. Fig. 4 is a horizontal section on the line 4 4 of Fig. 2.

Referring to the drawings, 1 indicates my improved box, comprising side walls 2, end walls 3, and a bottom 4. This box is composed of any suitable material, but preferably sheet-iron, and is provided with a lid 5, made in two sections, hinged, as at 6, one of the sections being pivoted upon a rod 7, extending transversely of the box and mounted at its ends in bearings formed in vertical ears secured to the sides of the box by bolts or the like, the other section being pivoted to a narrow strip 8, which in turn is hinged to the rod 7.

9 indicates two sheet-metal guides or ways mounted transversely of the box at its inner forward end near its top. These guides receive and sustain a drawer 10, mounted to slide therein and provided at its outer end with a suitable operating-handle. This drawer is for the purpose of holding tools or the like when the box is used upon a traction-engine and when closed is adapted to be locked by means of a vertically-depending finger 11, carried by the under side of the front lid-section in position to engage the inner end wall of the drawer when the lid-section is closed, the lid-section being in turn provided with a suitable lock 12.

The coal is loaded into the box at its upper rear end and is withdrawn from the same from time to time, as circumstances may require, through a discharge-spout 13, formed through one of its side walls at or near its bottom. This spout, which is adapted to be closed when the box is being filled with coal, comprises end plates or members 14, pivoted to the side of the box, as at 15, and adapted when the spout is open to extend at right angles to the side of the box, and a bottom or chute member 16, pivoted at its lower edge to a rod 17, which extends longitudinally of the bottom of the box. The end members of the spout are each composed of two sector-shaped sections pivoted at their lower ends and provided at their upper ends with a series of holes 18, adapted to receive a removable bolt, by which construction the sections may be folded upon each other to adjust them for varying the inclination of the bottom member and may be secured in their adjusted positions. The bottom member swings upon its pivot toward and from the side of the box and is sustained at its outer end by means of a tie rod or bolt 19, which is passed through the holes in the end members and extends longitudinally of the bottom member, beneath the free end of the same. This spout communicates with the interior of the box through a rectangular opening formed in the side wall thereof, which opening may be closed, when desired, by moving the bottom member 16 to a vertical position and folding the end members over the same and securing the members in their folded positions by means of suitable bolts or the like, as illustrated in Fig. 4.

20 is a vertically-moving slide provided at its ends with a plurality of vertically-disposed holes engaged by bolts which are passed through vertically-disposed slots 21, formed in the side wall of the box. This slide is mounted at the upper end of the discharge-opening and is adapted to be moved up or down as circumstances may require to increase or diminish the size of the opening, thus controlling the amount of material which is fed thereto.

22 is a hook secured to the outer end wall of the box and adapted to receive a shovel or the like.

23 is a covering of wood upon the outer surface of the front lid-section to form a driver's seat when the device is used upon a traction-engine, and 24 is a foot-rest mounted at the end of the box in proper position beneath the seat. It is to be understood that this foot-rest may be omitted when desired or when rendered necessary by circumstances.

It is to be understood that I do not limit or confine myself to the precise details herein shown and described, as various minor changes may be made therein without departing from the spirit or scope of my invention.

Having thus described my invention, what is claimed is—

1. The combination with a coal-box, of a spout therefor, said spout comprising end members projecting from the box, and a side member pivoted at one edge and adapted to swing on its pivot toward and from the box, and means for securing the side member with relation to the end members in any desired adjusted position.

2. The combination with a coal-box, of a spout therefor, said spout comprising end members projecting from the box and each provided with a plurality of openings, a side member pivoted at one edge and adapted to swing radially toward and from the box, and a rod removably mounted in the openings in the end members and adapted to sustain the free end of the side member.

3. The combination with a coal-box, of a spout therefor, said spout comprising end members each composed of a plurality of sector-plates having a plurality of openings, said plates adapted to close one upon another to adjust them and be held in their adjusted position by means of a bolt engaging in the openings and a hinged side member movable toward and from the box and sustained by the end members.

4. The combination with a coal-box, of a spout therefor, said spout comprising end members each composed of a plurality of sector-plates adapted to close one upon another to adjust them, means for securing them in their adjusted positions, and a hinged side plate adapted to swing toward and from the box and sustained by the end members.

In testimony that I claim the foregoing as my own I have hereto affixed my signature in the presence of two witnesses.

CYRUS BURWELL.

Witnesses:
 GEO. W. CUMMINGS,
 THOS. A. BAKER.